(No Model.)

W. H. HINDS & E. N. EDMONDS.
MEASURING TANK.

No. 365,599. Patented June 28, 1887.

Witnesses:

Inventors:
Wm H. Hinds
E. N. Edmonds
By their Attorney
C. M. Alexander

UNITED STATES PATENT OFFICE.

WILLIAM H. HINDS AND EDWARD N. EDMONDS, OF ST. JOSEPH, MISSOURI.

MEASURING-TANK.

SPECIFICATION forming part of Letters Patent No. 365,599, dated June 28, 1887.

Application filed March 23, 1887. Serial No. 232,122. (No model.)

*To all whom it may concern:*

Be it known that we, WILLIAM H. HINDS and EDWARD N. EDMONDS, citizens of the United States, residing at St. Joseph, in the county of Buchanan and State of Missouri, have invented certain new and useful Improvements in Measuring-Tanks; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to liquid measures, and our object is to provide a measure which will always draw the exact amount of liquid from a reservoir that may be needed, cutting the flow off automatically.

Figure 1:
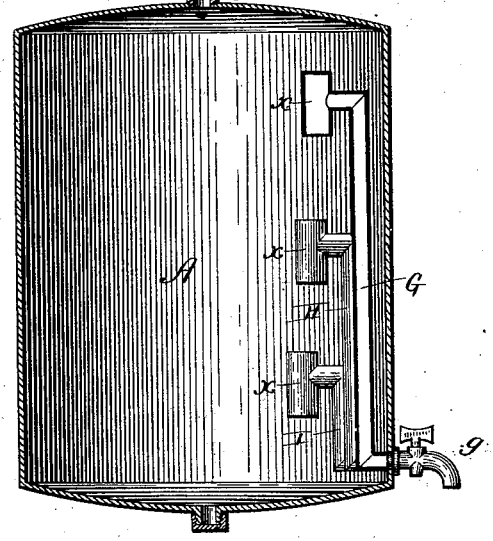
Figure 2:
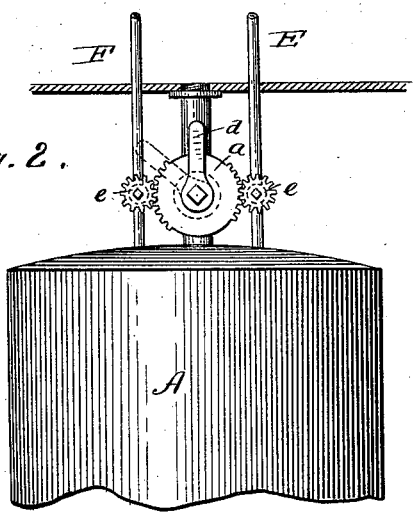

In the accompanying drawings, making part of this specification, Figure 1 represents an elevation in section, and Fig. 2 a partial side elevation.

In the figures, A represents a reservoir containing the liquid to be drawn off. This reservoir is fed from a tank, B, located a little distance above it.

C represents a pipe which connects the tank to the reservoir. This pipe is provided with a stop-cock, D, upon one end of which is secured a gear-wheel, $a$, and a lever, $d$.

E and F represent two pipes which pass up from the resevoir to a little above the liquid-line in the tank. These pipes are provided with stop-cocks similar to the stop-cock D in pipe C, each being provided with pinions $e$ and $f$, which gear into the wheel $a$. When the lever $d$ on stop-cock D stands in a vertical position, the flow of liquid from the tank B is shut off and the stop-cock of pipe F remains closed, while that of pipe E is open. To allow liquid from the tank to fill the reservoir the lever $d$ is turned to the left, as seen in dotted line. This movement of the lever opens cock D, as also the cock in pipe F. This allows the liquid to flow from the tank into the reservoir and at the same time allows the air from reservoir to escape through pipe F. If not known when the reservoir is full, the liquid will pass up pipe F until it reaches the level of the liquid in the tank above. The object of the stop-cock in the pipe E, it is evident, is to prevent the liquid rising in the same during the process of filling the reservoir, and the object in providing the pipe F with a stop-cock so arranged as to be closed while the reservoir is being emptied is to prevent any liquid that may flow into the said pipe during the filling of the reservoir from flowing back into the reservoir when the same is being emptied of its contents, thus insuring accurate measurement. Should there be no stop-cock in the pipe F, it is evident that whatever liquid had run into the same during the filling of the reservoir would flow out into the reservoir, and thereby prevent an accurate measurement—the principal object of this device. The amount of liquid rising into the pipe F during the process of filling the reservoir will depend upon the height of the liquid in the supply-tank above, the liquid in the said pipe rising up to the level of the liquid in the tank. When the lever $d$ is moved to a vertical position again, the cocks of pipes C and F are closed and the cock of pipe E is opened to allow air to enter the reservoir to permit the liquid therein to flow out when desired.

H, G, and I represent three pipes which are located in the reservoir, their ends protruding through the same and each provided with a stop-cock. These pipes are of different lengths in order that different quantities of liquid may be drawn off, the longest pipe being for the smallest quantity and the shortest pipe for the largest quantity, as is clearly evident.

Upon an elbow or horizontal extension formed upon the upper ends of each of the measuring-pipes is attached a short inverted cup, $x$, the lower rim or edge of which being a little below the upper end of the measuring-pipe, as clearly shown. The elbows or extensions of the measuring-pipes enter the sides of the cups, the cups being in a vertical position, as shown. The object in thus constructing the measuring-pipes is to prevent the liquid in the reservoir from entering any of the pipes before their stop-cocks are opened, thereby insuring a perfectly-accurate measurement.

It is obvious that in drawing liquid from the reservoir the measuring-pipes will form siphons, drawing the liquid off until it reaches the lower edge of the inverted cup upon the upper end of the pipes. In cases where the pipes in a reservoir stand vertically and open-ended the liquid will fill all of the pipes, and should you draw from the lower pipe first you would have a very incorrect measurement; but the cups in our case having air in them, the liquid is prevented from entering any of the pipes until the cock of the pipe you intend to draw from is opened, thus always insuring correctness.

When it is desired to refill the reservoir, it is only necessary to turn the lever $d$. This opens cock D and the cock of pipe F. The liquid, if there be any in said pipe, flows out and it then acts as an air-escape pipe.

Having thus fully described our invention, what we claim as new, and desire to secure by Letters Patent, is—

1. In a measuring-tank, the combination, with the supply-tank, of the reservoir provided with means for drawing off the liquid in measured quantities, the pipe C, connecting the tank and reservoir and provided with a stop-cock, a toothed wheel and operating-lever secured to said cock, air supply and exit pipes E and F, each of which is provided with stop-cocks, and toothed wheels secured to the stop-cocks in said pipes and engaging with the toothed wheel upon the stop-cock C, all arranged and operating substantially as described.

2. The combination, with the reservoir, of the measuring-pipes of various lengths and extending into the reservoir and provided at their lower ends with stop-cocks, their upper ends being provided with inverted cups, substantially as described.

In testimony whereof we affix our signatures in presence of two witnesses.

WILLIAM H. HINDS.
EDWARD N. EDMONDS.

Witnesses:
THERNOS WINN,
EDW. ALDEN.